United States Patent [19]

Snyder et al.

[11] Patent Number: 4,619,434
[45] Date of Patent: Oct. 28, 1986

[54] HEAT SENSITIVE MOTOR VALVE JACK

[75] Inventors: David E. Snyder; Billy R. Bruton, both of Longview, Tex.

[73] Assignee: Axelson, Inc., Longview, Tex.

[21] Appl. No.: 235,102

[22] Filed: Feb. 17, 1981

[51] Int. Cl.$^4$ .................................... F16K 31/00
[52] U.S. Cl. .................................. 251/14; 137/72; 137/75; 137/77
[58] Field of Search ............... 137/77, 75, 72; 251/14

[56] References Cited

U.S. PATENT DOCUMENTS

| | | | |
|---|---|---|---|
| 800,740 | 10/1905 | Hoelder | 137/75 |
| 2,817,349 | 12/1957 | Seaver | 137/75 |
| 2,997,052 | 8/1961 | Mangini | 137/77 |
| 3,958,592 | 5/1976 | Wells | 137/77 X |
| 4,044,785 | 8/1977 | Larsen | 137/75 |
| 4,240,455 | 12/1980 | McGee | 137/77 |

FOREIGN PATENT DOCUMENTS 2009888  6/1979  United Kingdom .................. 137/72

*Primary Examiner*—Harold W. Weakley
*Attorney, Agent, or Firm*—Hubbard, Thurman, Turner & Tucker

[57] ABSTRACT

Disclosed is a heat sensitive jack for overriding a valve including a valve body and a gate valve member connected to a valve stem which is operated by a linear actuator having an actuator body and an actuator stem connected to the valve stem extending outwardly of the actuator body, wherein the actuator stem is movable between an open and a closed position, and wherein no hazardous projectiles are formed when the stem moves to the closed position. The jack includes a cap connectable to the body and a nut axially movably disposed in the cap for movement between a first position and a second position, wherein the distance between the first and second positions is at least as great as the distance between the open and closed positions of the valve. A fusible element is provided to normally maintain the nut in the first position, but which upon being exposed to excessive temperature will allow the nut to move to the second position within the cap. A jack screw is threadably engaged in an axially movable with respect to the nut and adapted to be moved into abuttment with the jack stem when the cap is connected to the actuator body to jack the stem toward the open position.

9 Claims, 3 Drawing Figures

FIG. 3
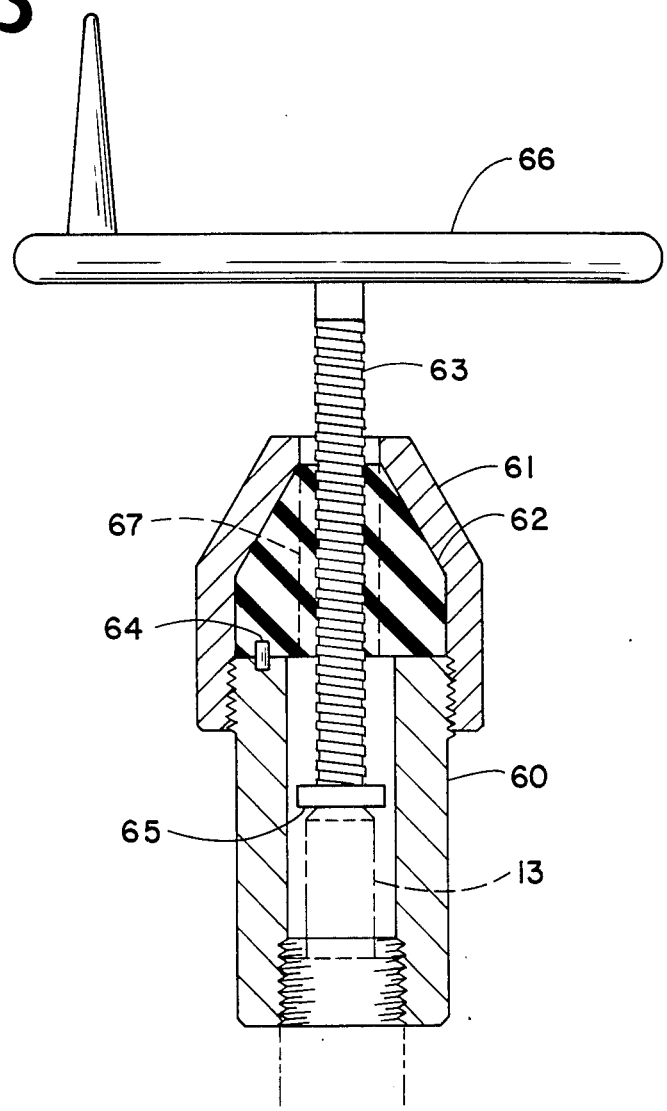
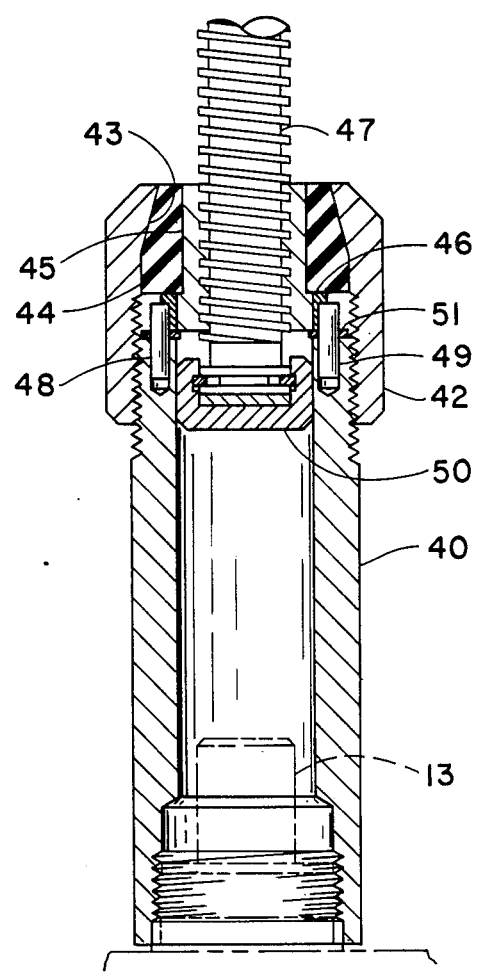
FIG. 2

HEAT SENSITIVE MOTOR VALVE JACK

BACKGROUND OF THE INVENTION

A. Field of the Invention

This invention relates to a manual jack for moving a linear actuator stem of a motor valve in normal operation from a closed position to an open position, but which, when exposed to temperatures above a certain level, will automatically allow the stem to move to the closed position.

B. Description of the Prior Art

Many gate valves are equipped with hydraulic or pneumatic linear actuators that are adapted to move the valve between open and closed positions. Gate valves so equipped are commonly referred to as motor valves. Typically, hydraulic or pneumatic pressure in the actuators holds the gate in the open position. Upon release of the pressure within the actuator, pressure within the valve body acting upon the valve stem moves the gate to the closed position. Normally, the operation of motor valves is automatic.

In many instances, however, it is desirable to override the operation of the linear actuator and manually move the valve the open position. Manual override may be accomplished by mounting a jacking apparatus to the actuator. The jacking apparatus is used to move the stem to the open position, where it will remain until the jacking apparatus is operated to close the valve.

However, prudent operations and some government regulations require that an unattended valve have means for allowing the valve to close in case of fire.

One heat sensitive manual override device of the prior art is disclosed in Wicke, U.S. Pat. No. 3,842,854. In the device of Wicke, the jacking apparatus is releasably connected to the actuator body. A fusible element operates to maintain the connection between the jacking apparatus and the actuator body. Upon melting of the fusible element, the jacking apparatus and actuator body disengage, whereupon pressure within the valve body drives the gate to the closed position. It is intended that after disengagement, the jacking apparatus of Wicke will simply fall off the actuator. In actual practice, however, the line pressure acting across the valve stem when the operator becomes disconnected causes abrupt and forceful movement, which converts the operator into a projectile. The operator may be propelled several tens of feet before it comes to rest, which creates an obvious hazard.

It is therefore an object of the present invention to provide a heat sensitive operator that is operable to move a linear actuator stem between open and closed positions during normal operations and, upon being exposed to excessive temperatures, being operable to automatically allow the stem to move to the outer position.

Another object is to provide such an operator which, upon being exposed to excessive temperature, permits the stem to move under the influence of line pressure to an outer position without producing any pieces or mechanisms which could act as projectiles and present a hazard to nearby personnel and equipment.

Another object is to provide such an operator wherein the fusible element is arranged in such a manner as to dampen the movement of the stem and prevent slamming and abrupt impacts in the actuator or valve.

Another object is to provide such an operator which is constructed so that after melting of the fusible element and movement of the stem to its outer position, it will be readily apparent to an observer that the stem is in such position.

SUMMARY OF THE INVENTION

Briefly stated, the foregoing and other objects of the present invention are accomplished by providing an apparatus for moving the stem of a linear actuator having a stem reciprocable in an actuator body between inner and outer positions that is adapted to allow the stem to move to the outer position when the temperature around the apparatus exceeds a certain temperature. The apparatus includes a cap connectable to the actuator body, a fusible element contained within the cap, and a jacking screw interconnected with the fusible element. In normal operation, outward forces are transmitted from the jacking screw through the fusible element to the cap. In elevated temperature conditions, the fusible element melts or shears and permits the jacking screw to move outwardly with respect to the cap to the closed position.

In one embodiment of the invention, the cap has a conical upper portion and the interconnection between the fusible element and the jacking screw is established by a nut having an annular outwardly extending flange threaded onto the jacking screw. In another embodiment of the present invention, the cap includes a conical upper portion and the jacking screw is threaded through the fusible element. In a further embodiment of present invention, the cap includes a tubular portion having an annular inturned shoulder and the interconnection is established by a nut having an outwardly extending annular flange which compresses the fusible element against the shoulder.

BRIEF DESCRIPTION OF THE DRAWINGS

FIG. 2 is a sectional view of one alternative embodiment of the present invention.

FIG. 3 is a sectional view of still another embodiment of the present invention.

DESCRIPTION OF THE PREFERRED EMBODIMENT

Figure 1:
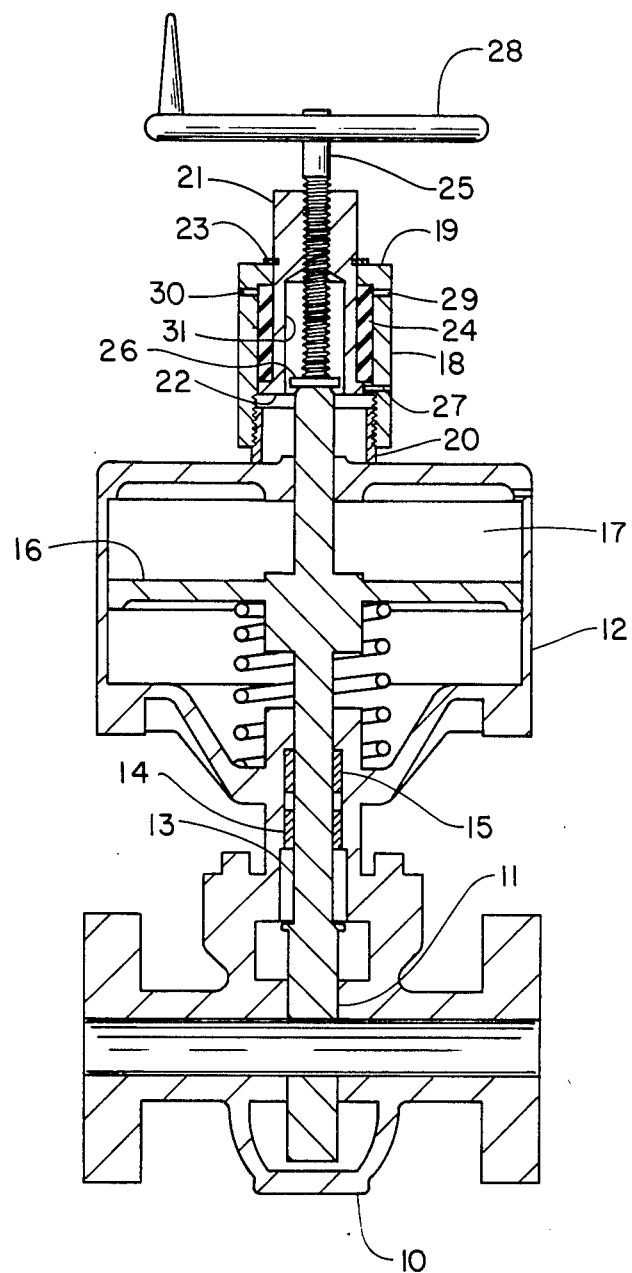
FIG. 1 is a sectional view of a gate valve and linear actuator having connected thereto one embodiment of the present invention.

Referring to FIG. 1, there is shown a motor valve having a body 10, a gate 11, and a pneumatic or hydraulic actuator 12. Gate 11 is connected to a stem 13, which extends through packing elements 14 and 15 into linear actuator 12. Stem 13 is connected to a piston 16 that is reciprocably mounted in linear actuator 12 and which is adapted to move gate 11 to the open position, as shown in FIG. 1, under the influence of hydraulic or pneumatic pressure in the space 17 above piston 16. Upon release of pressure within space 17, line pressure within body 10 drives gate 11 and stem 13 upwardly to the closed position (not shown).

The motor valve as thus far described is conventional and the various elements can take other forms so long as a gate is provided which can be moved between first and second positions to control flow through the valve body and, also, there is provided a stem which extends outwardly of the linear actuator body and which is urged outwardly of the actuator body by pressure in the valve body acting over an area equivalent to that of the stem within the seal.

The jack of the present invention, in the form shown in FIG. 1, includes a tubular cap 18 having an inturned annular shoulder 19. Cap 18 is threaded onto a ring 20 that is connected to linear actuator 12. The jack further includes a cylindrical nut 21 which is adapted for axial movement with respect to cap 18 and which has an outwardly inturned annular flange 22. Means, as for example a snap ring 23, are provided for limiting the downward movement of nut 21 with respect to cap 18. A cylindrical fusible element 24 is positioned between cap 18 and nut 21 and normally opposes movement of flange 22 toward shoulder 19 to hold nut 21 and cap 18 in a first position with respect to each other. A jack screw 25 is threaded through nut 21 and is provided with a foot 26 adapted to abut stem 13. Nut 21 includes a central cavity that accommodates inward and outward movement to jack screw 25. Detent means, as for example pin 27 are provided for preventing rotation of nut 21 with respect to cap 18. Jack screw 25 may be rotated with a conventional handwheel 28, thereby to jack stem 13 inwardly toward the open position when nut 21 and cap 18 are in the first position with respect to each other, thereby to override linear actuator 12.

With the foregoing arrangement, it can be seen that the thrust forces developed by stem 13 are transmitted across fusible element 24 to cap 18 and thence to linear actuator 12. These thrust forces will consist primarily of force developed by the pressure within valve body 10 acting across an area equal to stem 13 within seal 14.

When fusible element 24 is heated sufficiently, as by a fire in the vicinity, it will melt or fuse and the force generated by internal valve pressure acting on stem 13 will cause the melted material to be extruded out of openings 29 and 30 in cap 18. As the material is so extruded, stem 13 will move outwardly and the valve will tend to close. Shoulder 19 and flange 22 are spaced axially far enough apart so as to allow gate 11 to close completely while retained. Thus, when fusible element 24 is melted, jackscrew 25, handwheel 28 and nut 21 are retained within cap 18 by shoulder 19, thereby eliminating the formation of hazardous projectiles.

As indicated above, high pressures within the valve body can act, if unrestrained, to cause the valve elements to slam violently into the closed position. In accordance with one aspect of this invention, this is prevented by selecting the number and size of openings 29 and 30 to be such that the melted fusible material is extruded therefrom at a rate which is sufficiently low that the outward movement of stem 13 is dampened and the impact of valve closure is of an acceptable magnitude.

Referring now to FIG. 2, there is shown an alternative embodiment of the present invention. A cap 40 is provided having an upper portion 42 with a conically tapered internal shoulder 43. A fusible element 44 is contained within upper portion 42 and conformed to fit internal shoulder 43. A nut 45 having a flange 46 is contained within fusible element 44 and has threaded therethrough a jackscrew 47. Rotation of nut 45 with respect to cap 40 is prevented by a pair of pins 48 and 49 which engage flange 46. A foot 50 is connected to one end of jackscrew 47 and is adapted to move within cap 40 to jack stem 13 inwardly. Outward closing forces are normally opposed by fusible element 44 acting between conical shoulder 43 and flange 46. However, when the jack is subjected to excessive temperatures, fusible element 44 will begin to melt and outward thrust forces will cause shearing of fusible element 44 and allow nut 44 to move outwardly with respect to cap 40.

The diameter of foot 50 is greater than the inside diameter of a spacer 51. Upon release of jackscrew and nut 45 due to exposure to elevated temperature the outward movement of these parts is limited by spacer 51 thus preventing any parts from becoming projectiles.

Referring now to FIG. 3, there is shown an embodiment of the jack of the present invention that permits relatively rapid movement of stem 13 upon melting of the fusible element. The jack includes a cap 60 having a conical upper portion 61. A conical fusible element 62 is contained within upper portion 61 and has threaded directly therethrough a jackscrew 63. Rotation of fusible element 62 with respect to cap 60 is prevented by a pin 64. Jack screw 63 has a foot 65 that is adapted to abut and jack inwardly stem 13. Upon rotation of a handwheel 66 conected to jackscrew 63, jackscrew 63 moves inwardly or outwardly with respect to fusible element 62 and cap 60. The thrust forces involved in jacking stem 13 inwardly to override the valve actuator are transmitted through the threads of jackscrew 63 into fusible element 62 and thence to cap 60. As stem 13 applies an upward force against fusible element 62, there will be a wedging action due to the conical arrangement to cause fusible element 62 to be thrust into tighter engagement with the threads of jackscrew 63. As a result, if the material of the fusible element has any cold flow properties, such can be accomodated while maintaining the fusible element in proper threaded connection with the jackscrew.

When a fire or other elevated temperature condition heats fusible element 62, it will loose its compressive strength and resistance to shear to a point where the outwardly directed force on jackscrew 63 will cause fusible element 62 to shear in the vicinity of line 67. As a result, stem 13 can move rapidly outwardly carrying with it the sheared out plug of material still engaging the threads of jackscrew 63. The diameter of the foot 65 being larger than the diameter of the opening on cap 61 prevents the jackscrew 63 from becoming a projectile by retaining it within the assembly.

In general, the fusible elements of this invention can be made from materials that have physical properties suitable for undergoing the stresses and strains inherent to the normal operation of the motor valve. In addition, such material should have a softening or melting point which will permit the motor valve to be closed when the temperature in the vicinity of the actuating mechanism reaches a level selected by the designer of the valve. Ordinarily this level will be a temperature within the range of 300° F. to 400° F. for ambient service of the valve but can be higher or lower. An example of a preferred one of such materials is an acetal resin marketed under the trade name DELRIN. Other materials which can used are nylon-6/6 marketed under the name ZYTEL, a polycarbonate marketed under the name LEXAN, NORYL which is a modified polyelyphene oxide and TEXIN which is a polyurethane. Also, there are a family of lower melting point metal alloys which can be used including 30/70 bar solder, woods metal, etc.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A heat sensitive jack for overriding a motor valve including a valve body and a gate valve member connected to a valve stem movable outwardly with respect to said valve body by pressure within said valve body which is operated to move inwardly by a linear actuator having an actuator body and an actuator stem connected to the valve stem and extending outwardly of the actuator body, said heat sensitive jack being operable to move and hold said actuator stem inwardly but to allow said actuator stem to move outwardly in elevated temperature conditions without producing hazardous projectiles, which comprises:
   a cylindrical cap connectable to said actuator body said cap including a radially inwardly extending shoulder facing axially toward said actuator body when said cap is connected to said actuator body;
   a nut axially movably disposed in said cap said nut including a radially outwardly extending flange facing toward said shoulder of said cap and movable between a first position and a second position, wherein the distance between said first and second positions is at least as great as the distance of inward and outward travel of said actuator stem, whereby said flange of said nut remains within said cap in said second position;
   a fusible element positioned between said shoulder and flange to transmit forces therebetween for normally maintaining said nut in said first position and melting when the temperature exceeds a certain temperature allowing said nut to move to said position within said cap;
   and a jack screw threadably engaged in and axially movable with rspect to said nut and adapted to be moved into abuttment with said stem when said cap is connected to said actuator body to jack said stem toward said open position.

2. The jack as claimed in claim 1, wherein said nut includes a cavity for accomodating said actuator stem for movement inwardly and outwardly when said nut is in said first position.

3. The jack as claimed in claim 1, wherein said cap includes an opening for restricting the rate of flow of melted fusible material therethrough to limit the rate of movement of said flange toward said shoulder.

4. For use with a linear actuator having a stem reciprocable in an actuator body between inward and outward positions, a jack for moving said stem from said outward position to said inward position and allowing said stem to move to said outward position when the temperature around said apparatus exceeds a certain temperature, which comprises:
   a conical cap connectable to said actuator body, said cap having a central opening;
   a fusible element contained within said cap;
   and a jack screw threadably engaged in said fusible element and having a foot adapted to be moved into abuttment with said stem when said cap is connected to said actuator body when said cap is connected to said actuator body to jack said stem toward said closed position, wherein said foot has a diameter greater than that of said central opening in said cap, whereby said foot is retained within said cap when said stem moves to said closed position.

5. A heat sensitive jack for overriding a motor valve including a valve having a body and a gate valve member connected to a valve stem movable outwardly with respect to said valve body by valve body pressure which is operated to move inwardly by a linear actuator having an actuator body connected to the valve body and an actuator stem connected to the valve stem and extending outwardly of the actuator body, said actuator stem being movable between inward and outward positions, which comprises:
   a cap connectable to said actuator body, said cap including a shoulder facing toward said actuator body when said cap is connected to said actuator body;
   a fusible element contained within said cap in axial abuttment with said shoulder; and
   a jack screw movably interconnected with said fusible element to transmit forces through said fusible element to said shoulder to move said jack screw into abuttment with said actuator stem when said cap is connected to said actuator body to jack said actuator stem inwardly, wherein said fusible element is adapted to allow said jack screw to move outwardly with said actuator stem when the temperature exceeds a certain temperature while said cap remains connected to said actuator body, and wherein said jack screw is retained within said cap after said fusible element melts thereby preventing the formation of projectiles.

6. The jack as claimed in claim 5, wherein:
   said fusible element and said jack screw are interconnected by a nut threadably engaged with said jack screw, said nut including a piston extending through said shoulder and an outwardly extending annular flange, said fusible element being compressed between said flange and shoulder normally to maintain said flange and shoulder in a spaced apart first position and upon melting of said fusible element allowing said flange and shoulder to move toward each other to a second position wherein the distance between said first and second position is at least as great as the distance between said inward and outward positions.

7. The jack as claimed in claim 5, wherein said cap includes:
   a conical upper portion.

8. The apparatus as claimed in claim 7, wherein said fusible element and said jack screw are interconnected by a nut threadably engaged with said jack screw, said nut including an annular outwardly extending flange contacting said fusible element.

9. The apparatus as claimed in claim 7, wherein said jacking screw is threadably engaged with said fusible element to thereby interconnect said fusible element and said jacking screw.

* * * * *